United States Patent
Kikuchi

(10) Patent No.: US 8,064,765 B2
(45) Date of Patent: Nov. 22, 2011

(54) OPTICAL SIGNAL MONITORING SYSTEM AND OPTICAL SIGNAL MONITORING METHOD

(75) Inventor: Baku Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 782 days.

(21) Appl. No.: 12/051,942

(22) Filed: Mar. 20, 2008

(65) Prior Publication Data

US 2008/0232796 A1 Sep. 25, 2008

(30) Foreign Application Priority Data

Mar. 23, 2007 (JP) ................................. 2007-077489

(51) Int. Cl.
*H04B 10/04* (2006.01)
*H04B 10/08* (2006.01)

(52) U.S. Cl. .............................. 398/33; 398/38; 398/195

(58) Field of Classification Search .................... 398/25, 398/26, 30–33, 38, 93–95, 195–197
See application file for complete search history.

(56) References Cited

U.S. PATENT DOCUMENTS

| | | | |
|---|---|---|---|
| 2003/0048813 A1* | 3/2003 | Lahav et al. | 370/537 |
| 2004/0131355 A1* | 7/2004 | Takeshita | 398/33 |
| 2005/0105901 A1* | 5/2005 | Yavor et al. | 398/30 |
| 2005/0111788 A1* | 5/2005 | Tsuyama | 385/24 |

FOREIGN PATENT DOCUMENTS

| | | |
|---|---|---|
| JP | 09252283 A | 9/1997 |
| JP | 2005159586 A | 6/2005 |
| JP | 2006074698 A | 3/2006 |
| JP | 2006189465 A | 7/2006 |

OTHER PUBLICATIONS

Japanese Office Action for JP2007-077489 issued Aug. 12, 2011.

* cited by examiner

*Primary Examiner* — Dalzid Singh

(57) ABSTRACT

An optical signal monitoring system includes a bit rate information collecting unit and a monitoring unit. The bit rate information collecting unit gets bit rate information indicating a bit rate of an optical signal passing through an optical communication path. The monitoring unit extracts a monitoring optical signal from the optical communication path. When the bit rate information is not able to get, the monitoring optical signal is judged to be a noise. This system can make a sharp distinction between a broad optical signal whose bit rate is over 40 Gbit/sec and the ASE noise. Further, this system can correct optical signals dependently to those bit rates.

12 Claims, 5 Drawing Sheets

OPTICAL SIGNAL MONITORING SYSTEM AND OPTICAL SIGNAL MONITORING METHOD

This Application is based on Japanese Patent Application No. 2007-077489, filed on Mar. 23, 2007. The disclosure of the Japanese Patent Application is incorporated herein by reference.

TECHNICAL FIELD

The present invention relates to a technique for monitoring an optical signal in an optical communication line. Especially, the present invention relates to a technique for monitoring an optical signal of a wavelength division multiplex system whose communication speed is high.

BACKGROUND ART

Referring to FIG. 1, an example of the optical monitoring technique in the wavelength division multiplex transmission (WDM) system will be explained. In a node in which an optical monitoring system is installed, some wavelength of an optical signal S3 included in a WDM optical signal S1 sent out from an upstream node is demultiplexed by an optical demultiplexer 102, and is dropped off through a transponder 106. Moreover, an optical signal S4 that is to be added in this node is added to an optical signal S2 that is included in the optical signal S1 except what was dropped therefrom through a transponder 108, becoming an optical signal S6 that is multiplexed in an optical multiplexer 104. The optical signal S6 is amplified by an optical amplifier 110, a part thereof is extracted by an optical branching device 112 as an optical signal S5 for monitoring, and the part except the extracted optical signal is made to transmit to a downstream side. An optical monitoring module 120 monitors the optical signal S5. The optical monitoring module 120 detects a peak value of signal light, and measures various parameters.

For monitoring an optical signal, an optical monitoring functional device for detecting and monitoring a signal of a bandwidth that is equivalent to a transmission speed of about 10 Gbit/sec can be used. In the case of such a transmission speed, even if the wavelength resolution of an optical monitoring module inside an optical monitoring functional device was coarse, the optical signal could be detected without error.

Listed below are documents relevant to optical monitoring techniques of the optical communication system.
1. Japanese Laid-Open Patent Application JP-P2006-189465A
2. Japanese Laid-Open Patent Application JP-P2006-074698A
3. Japanese Laid-Open Paten Application JP-A-Heisei, 9-252283

SUMMARY

However, since a demand for detecting broadband signals, such as of a transmission speed of 40 Gbit/s has occurred in recent years. Therefore, an optical monitoring technique having finer resolution has been required. However, when the resolution is set finer, since ASE (Amplified Spontaneous Emission) noise and a signal of 40 Gbit/s exhibit analogous spectra under some circumstances, there are some situations where it is difficult for the module to discriminate them to each other.

Moreover, in a measurement of optical lights of a broad bandwidth, it will be necessary to make the resolution finer, and it is required to discriminate optical signals of different bit rates to each other. When there is no identification signal, various parameters cannot be corrected accurately.

Then, an exemplary object of the present invention is to provide a system and method for monitoring an optical signal of a fast transmission speed accurately.

Another exemplary object of the present invention is to provide a system and method for monitoring optical signals of bit rates being different to each other with high precision.

Further another exemplary object of the present invention is to provide a system and method for monitoring an optical signal and the ASE noise (spontaneous emission light) with discriminating them to each other accurately.

In an exemplary embodiment of a present invention, an optical signal monitoring system includes: a bit rate information collecting unit configured to collect bit rate information indicating a bit rate of an optical signal sent through an optical communication path; and a monitoring unit configured to extract a monitoring optical signal from the optical signal sent through the optical communication path and correct a parameter extracted from the monitoring optical signal based on the bit rate information.

In another exemplary embodiment of the present invention, an optical signal monitoring system includes: a bit rate information collecting unit configured to collect bit rate information indicating a bit rate of each of optical signals respectively path through a plurality of optical communication paths; and a monitoring unit configured to extract each of the optical signals sent through the plurality of optical communication paths sequentially as a monitoring optical signal and correct a parameter extracted from the monitoring optical signal based on information included in the bit rate information and indicating a bit rate of a corresponding optical communication path of the plurality of optical communication paths.

In further another exemplary embodiment of the present invention, an optical signal monitoring method includes: collecting bit rate information indicating a bit rate of an optical signal sent through an optical communication path from a predetermined information processing node through a signal line; extracting a monitoring optical signal from the optical signal sent through the optical communication path; and correcting a parameter extracted from the monitoring optical signal based on the bit rate information.

According to an exemplary embodiment of the present invention, a system and method for monitoring an optical signal of a fast transmission speed is provided.

Further, according to an exemplary embodiment of the present invention, a system and method for monitoring optical signals of bit rates being different to each other with high precision is provided.

Still further, according to an exemplary embodiment of the present invention, a system and method for monitoring an optical signal and the ASE noise with discriminating them to each other accurately is provided.

BRIEF DESCRIPTION OF THE DRAWINGS

The above and other objects, advantages and features of the present invention will be more apparent from the following description of certain exemplary embodiments taken in conjunction with the accompanying drawings, in which.

EXEMPLARY EMBODIMENTS

Hereinafter, an optical device and manufacturing method thereof according to exemplary embodiments of the present invention will be described with reference to the attached drawings.

Figure 1:
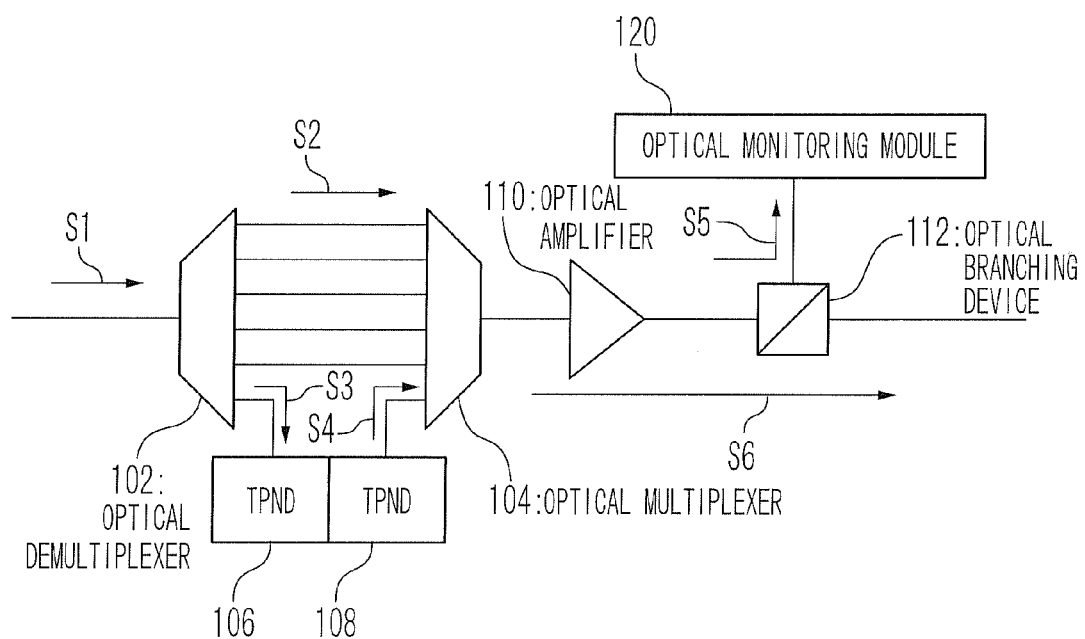
FIG. 1 shows an example of the configuration of a light monitoring system.
Figure 2:
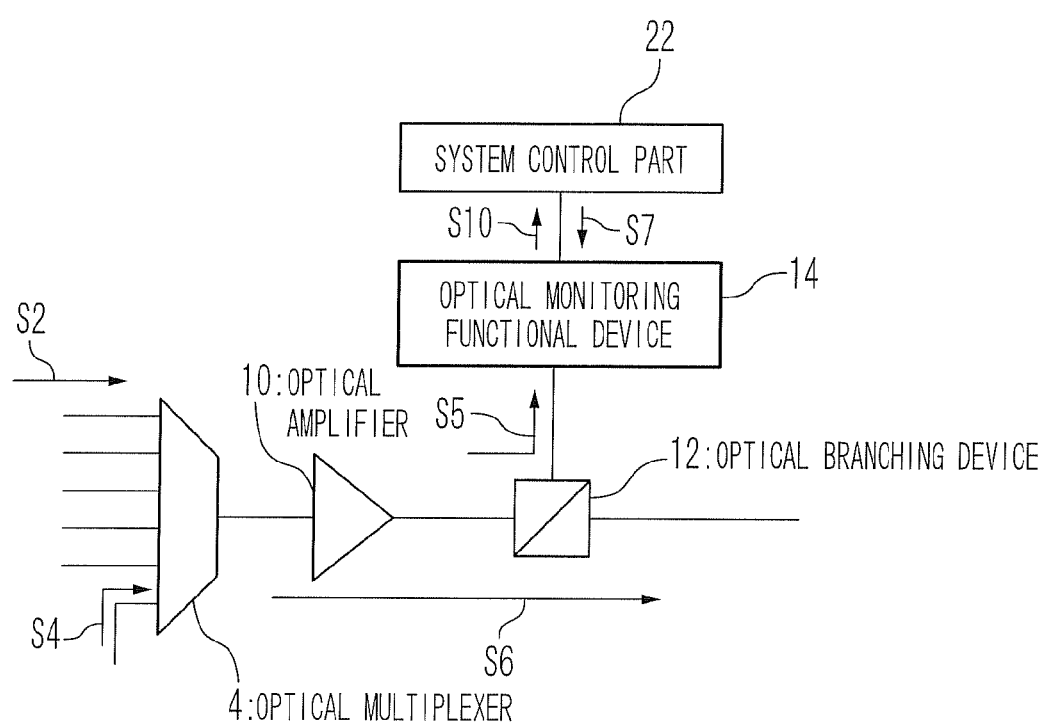
FIG. 2 shows a configuration of a light monitoring system.

FIG. 2 shows a configuration of an optical monitoring system. An optical signal S2 is transmitted from an upstream side of a node in which the optical monitoring system is installed. An optical multiplexer 4 combines the optical signal S2 and an optical signal S4 which is added in the node where the optical monitoring system according to the present exemplary embodiment is installed to generate an optical signal S6. The optical signal S6 is amplified by an optical amplifier 10. An optical branching device 12 extracts a part of the optical signal S6 that was amplified, and guides it to the optical signal monitoring system. A part of the optical signal S6 that was not extracted is transmitted to the downstream side.

The optical signal monitoring system is equipped with an optical monitoring functional device 14 and a system control part 22. The optical monitoring functional device 14 receives an optical signal S5 extracted by the optical branching device 12 to monitor on a wavelength-by-wavelength basis. As the optical monitoring functional device 14, a device capable of monitoring a WDM signal on a wavelength-by-wavelength basis that is exemplified by an optical spectrum analyzer and an optical channel monitor is used.

The system control part 22 sends out, to the optical monitoring functional device 14, a signal light information (bit rate information) S7 that is an electrical signal bearing information about the bit rate of an optical signal being transmitted through the node in which the optical monitoring system is installed. Based on the signal light information (the bit rate information) received from the system control part 22, the optical monitoring functional device 14 performs suitable correction on various parameters extracted from the optical signal S5 being monitored, such as a power and a wavelength.

When the optical signal S6 does not include an optical signal for conveying information but is the ASE noise, the system control part 22 does not transmit signal light information S7 to the optical monitoring functional device 14, or transmits a transmission halt signal indicating that no optical signal is transmitted as the signal light information S7. When not receiving the signal light information S7, or when receiving a transmission halt signal, the optical monitoring functional device 14 will recognize that the optical signal S5 being monitored is the ASE noise. Therefore, the ASE noise can be identified without being mistaken for an optical signal bearing information, especially for a high-speed optical signal of a speed of about 40 Gbit/s or more that exhibits an analogous spectrum as the ASE signal.

In this exemplary embodiment, transmission of the signal light information (the bit rate information) S7 from the system control part 22 to the optical monitor functional device 14 enables the ASE noise and the signal to be discriminated, which makes it possible to perform correction on the measured values of the detected optical signal S5 based on the bit rate. By this function, it is possible to suppress the possibility of erroneously detecting the ASE noise as the signal light and errors of the measured values only by detection of the peak.

First Exemplary Embodiment

Figure 3:
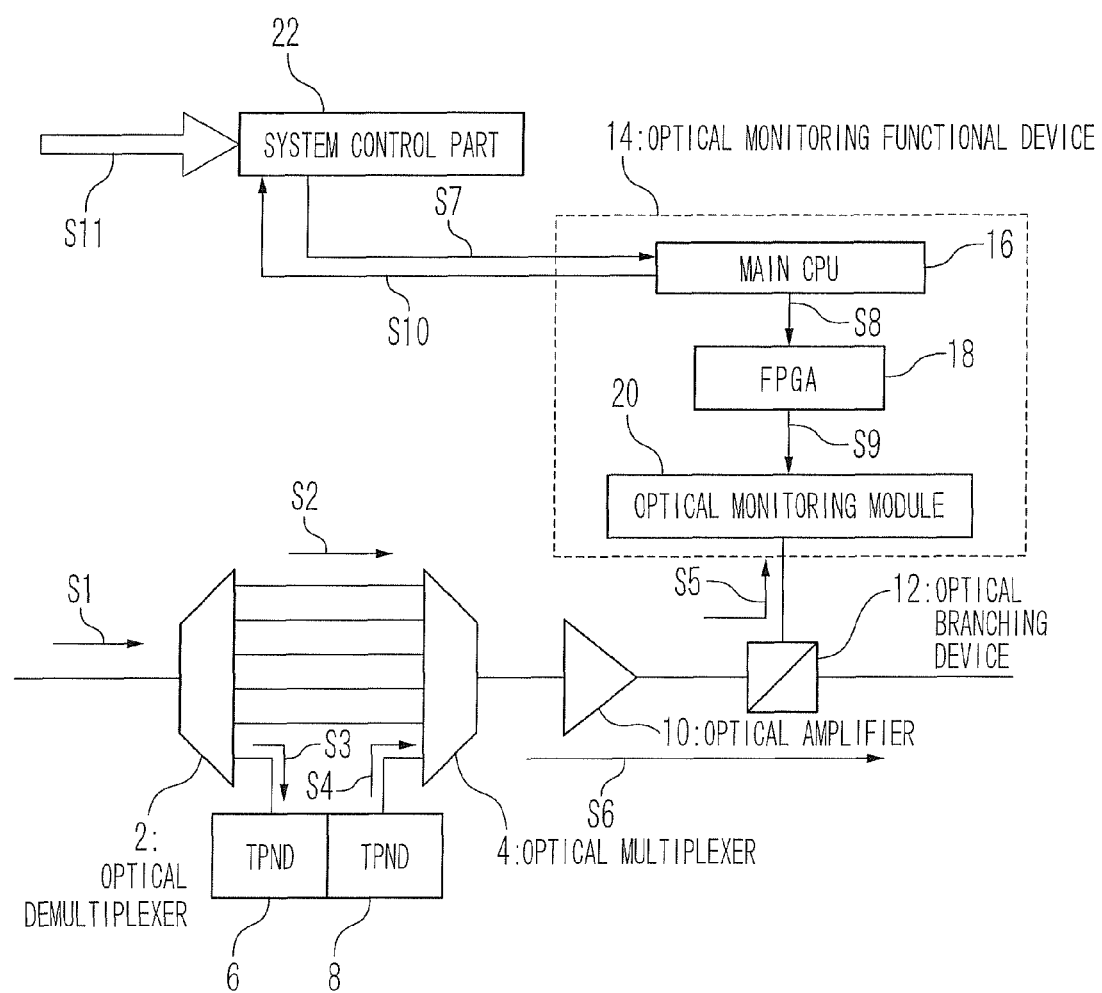
FIG. 3 shows a configuration of a light monitoring system.

FIG. 3 shows a configuration of the optical monitoring system according to a first exemplary embodiment of the present invention. In a node in which the optical monitoring system is installed, an optical signal S3 being a part of wavelengths of a WDM optical signal S1 sent out from an upstream node is demultiplexed by an optical demultiplexer 2, and is dropped off through the transponder 6. Moreover, through the transponder 8, the optical signal S4 is added to the optical signal S2 that is included in the optical signal S1 and was not dropped therefrom, and the two signals S2 and S4 is combined to become a multiplexed optical signal S6 by the optical multiplexer 4. The optical signal S6 is amplified by the optical amplifier 10, a part thereof is branched by the optical branching device 12, and the other part thereof is transmitted to the downstream side. Various parameters, such as wavelengths of the optical signals S1, S4, an S/N (Signal/Noise) ratio, the number of strands of optical fiber that acts as a transmission medium, etc. is supposed to be arbitrary.

The optical monitoring functional device 14 is equipped with a main CPU 16, an FPGA (Field Programmable Gate Array) 18, and an optical monitoring module 20. The system control part 22 gets the input signal light information including information that indicates the bit rate of the received signal light from an I/O interface for receiving the optical signal and other constituents. The main CPU 16 receives the signal light information S7 that is an electrical signal conveying information indicating the bit rate of the signal light that is transmitted through the node and other information from the system control part 22 through a communication interface, such as a LAN. The main CPU 16 transmits the received signal light information S7 to a FPGA 18 as signal light information S8. The FPGA 18 transmits the received signal light information S8 to the optical monitoring module 20 as signal light information S9. Based on the received signal light information S9, the optical monitoring module 20 corrects various parameters (a power, a wavelength, and an S/N ratio (signal/noise ratio)) that are characteristics values extracted from the optical signal S5 being monitored. Such a method of correcting parameters using the bit rate is known widely, and its explanation is omitted.

Next, the operations of the optical monitoring system having the configuration shown in FIG. 3 will be explained referring to FIG. 4. The optical monitoring module 20 monitors the optical signal S6 passing the node in which the optical monitoring system is installed by extracting the optical signal S5 (Step T1).

The system control part 22 collects the information on-line that indicates a signal type of the node in which the optical monitoring system is installed (including the bit rate information as to whether 40 Gbit/s transmitter-receiver is mounted and the like) S11 (Step T2).

The system control part 22 generates the signal light information S7 including information S11 indicating the collected information of the signal type to transmits to the optical monitoring functional device 14 (Step T3).

The main CPU 16 receives the signal light information S7 to transmit to the optical monitoring module 20 as the signal light information S9 through the FPGA 18. The optical monitoring module 20 recognizes the received signal light information (the bit rate information) S9 (Step T4).

The optical monitoring module 20 corrects various parameters extracted from the optical signal S5 based on the signal light information S9, as necessary, according to an algorithm previously registered in a storage device to generate optical signal parameter corrected values (a power, a wavelength, etc. obtained by correcting the measured values according to the bit rate). When there is no signal light information S9, or when the signal light information S9 indicating that no optical signal is transmitted into the node is received, the optical monitoring module 20 determines that there is no signal light (Step T5). The optical monitoring functional device 14 transmits the generated optical signal parameter corrected values S10 to the system control part 22.

The optical monitoring module 20 performs measurement of the optical signals of different bit rates in a similar manner. The resolution of the measurement is also the same irrespective of the bit rate. Then, the power is calculated by integrating power density obtained from measured values in an integration range based on the bit rate information received from the system control part 22. For example, when the bit rate information indicating that the bit rate of the optical signal is 40 Gbit/s is received, the power value is derived by performing integration in a range of wavelength of the signal corresponding to the bit rate (a range wider than 10 Gbit/s).

In nodes of OADM (Optical Add Drop Multiplexer) etc. where the optical signals of different bit rates exist together, performing such processing makes it possible to measure the optical power that corresponds to a signal spectral characteristic of the bit rate using a common hardware configuration.

The effects realized by the optical monitoring system of this exemplary embodiment are as follows. The first effect is that, since the optical monitoring functional device 14 has received the signal light information S7, accurate measurement of the signal light can be performed for signals of different bit rates by adding appropriate corrections thereto as necessary. Here, measurement items indicate all the parameters related to the signal light information, such as a power and a wavelength. The second effect is that, since the optical monitoring functional device 14 has received the signal light information (the bit rate information) S7 similarly as the first effect, the signal light and the ASE noise can be differentiated; therefore, the system can be configured to be able not to detect the ASE noise as signal light erroneously.

Second Exemplary Embodiment

Figure 5:
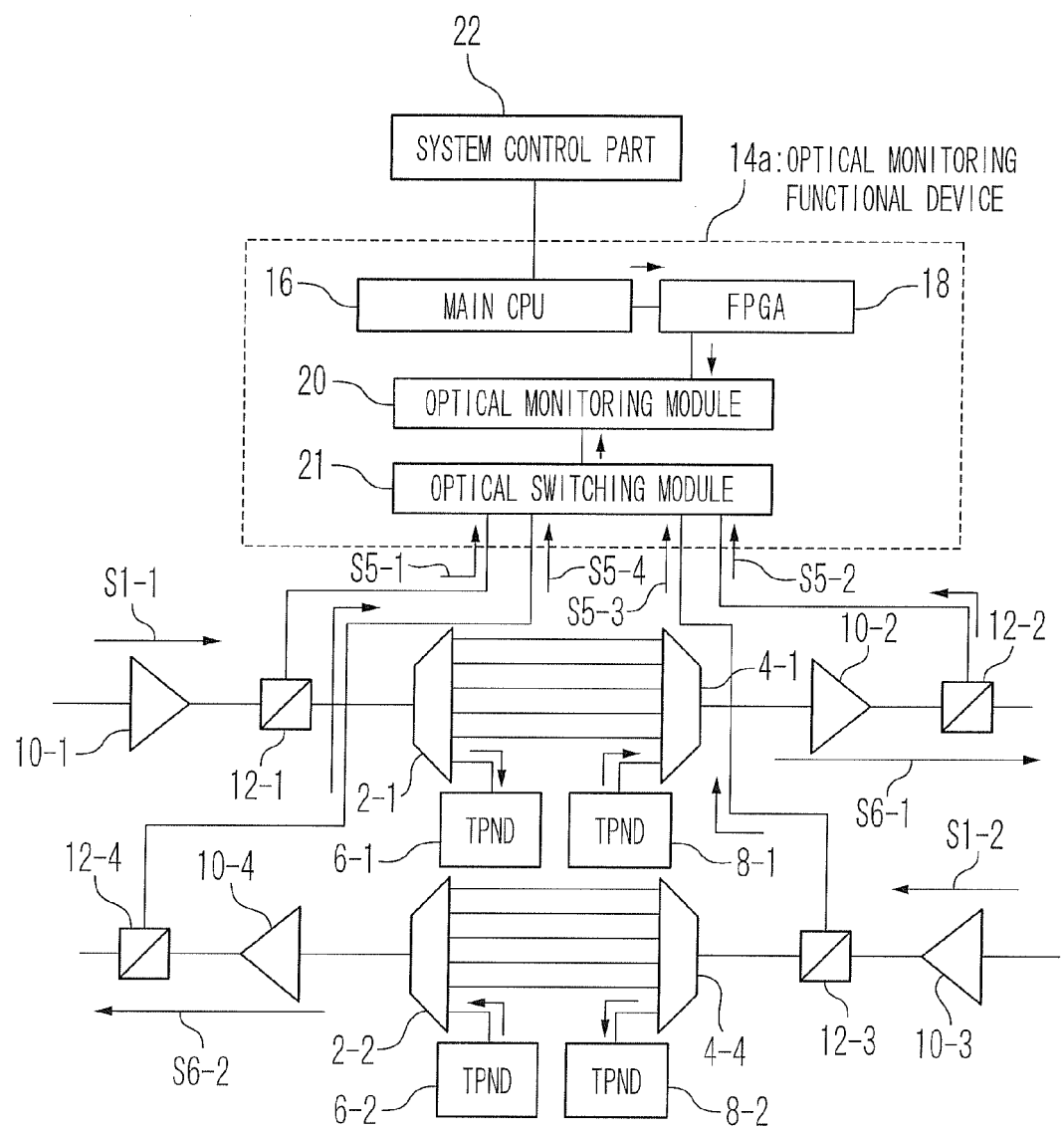
FIG. 5 shows a configuration of a light monitoring system.

FIG. 5 shows a configuration of the optical monitoring system in a second exemplary embodiment of the present invention. This optical monitoring system can monitor WDM optical signal in a plurality of locations. An optical monitoring functional device 14a in this exemplary embodiment is equipped with an optical switching module 21. The optical switching module 21 is a module for automatically switching ports to monitor a plurality of monitoring points sequentially by time sharing.

A subject that the optical monitoring system in this exemplary embodiment monitors is optical signals collected from a plurality of locations. A WDM optical signal S1-1 transmitted from a first upstream side node is amplified by an optical amplifier 10-1 and a part thereof is extracted by an optical branching device 12-1 as an optical signal S5-1 for monitoring. The other part of the optical signal S1-1 amplified by the optical amplifier 10-1 is partially dropped off in an optical demultiplexer 2-1 through a transponder 6-1, and this dropped signal is added with a new optical signal in an optical multiplexer 4-1 through the transponder 8-1 and is outputted as an optical signal S6-1. The optical signal S6-1 is amplified by an optical amplifier 10-2 and a part thereof is extracted by an optical branching device 12-2 as an optical signal S5-2 for monitoring.

A WDM optical signal S1-2 transmitted from a second upstream side node is amplified by an optical amplifier 10-3 and a part thereof is extracted by the optical branching device 12-3 as an optical signal S5-3 for monitoring. The other part of the optical signal S1-2 amplified by the optical amplifier 10-3 is partially dropped off in an optical demultiplexer 4-4 through a transponder 8-2, and this dropped signal is added with a new optical signal in an optical multiplexer 2-2 through a transponder 6-2 and is outputted as an optical signal S6-2. The optical signal S6-2 is amplified by the optical amplifier 10-4 and a part thereof is extracted by an optical branching device 12-4 as an optical signal S5-4 for monitoring.

The optical signals S5-1 to S5-4 collected from monitoring points in four locations are sequentially selected by the optical switching module 21, and are sent to the optical monitoring module 21. The system control part 22 collects signal light information indicating four bit rates in respective locations that are extracted from the optical signals S5-1 to S5-4. The collected signal light information is transmitted to the optical monitoring functional device 14a. In the optical monitoring functional device 14a, the signal light information is transmitted to the optical monitoring module 20 through the main CPU 16 and the FPGA 18. The optical monitoring functional device 14a controls so that the timing at which the signal light information is transmitted to the optical monitoring module 20 is coincide with the timing at which one optical signal for monitoring that corresponds to the signal light information (any one of the optical signals S5-1 to S5-4) is selected by the optical switching module 21 and is monitored by the optical monitoring module 20.

Figure 4:
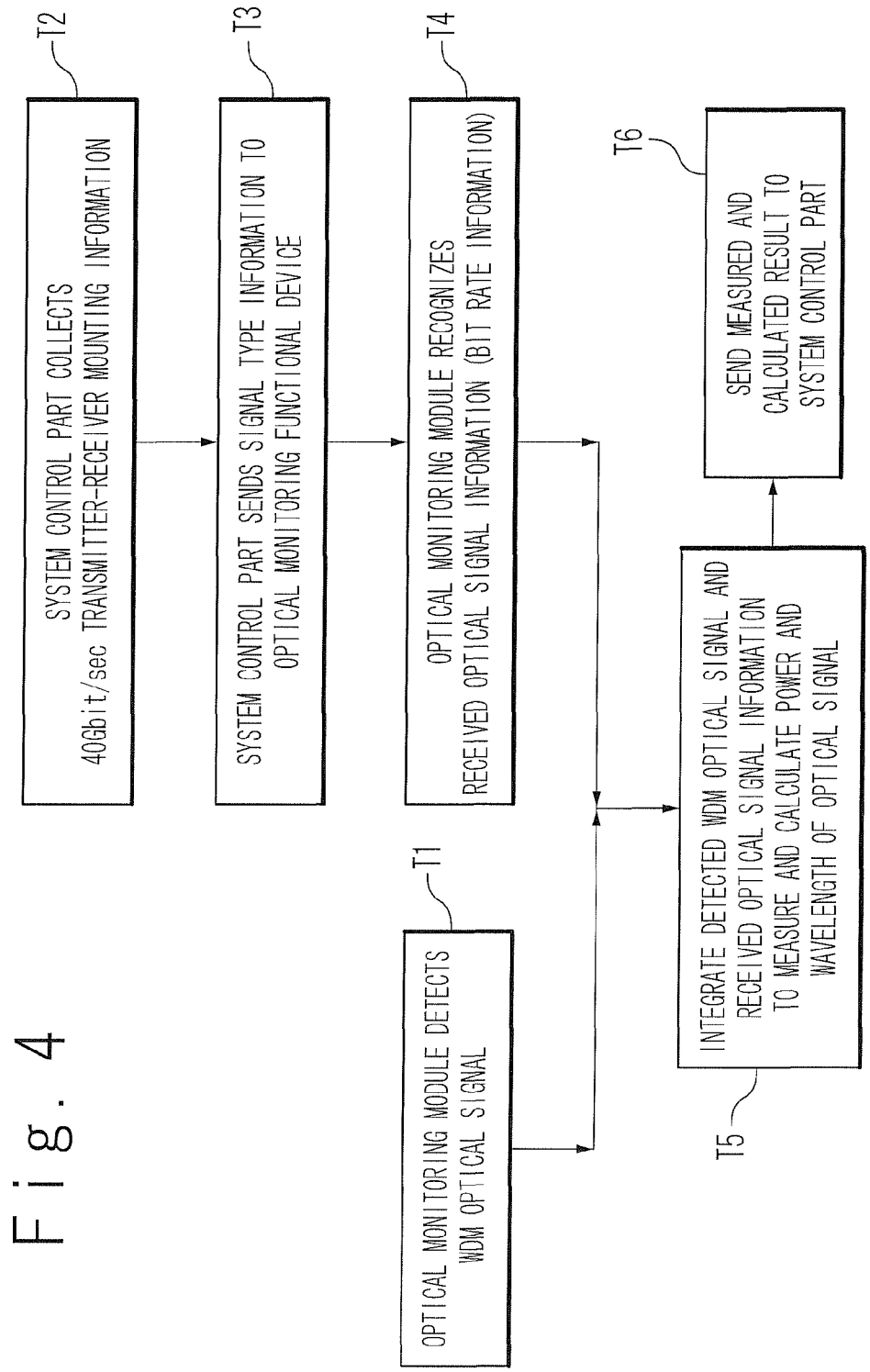
FIG. 4 shows operations of a light monitoring system.

The optical monitoring module 20 performs the same measurement and correction as those of the optical monitoring module 20 explained in FIGS. 3 and 4 based on the optical signal for monitoring and the signal light information that were received at the same timing. As described in the foregoing, in this exemplary embodiment, since the optical switching module is configured to be able to switch ports, so that effects that monitoring in a plurality of locations can be performed in a short time with a single optical monitoring functional device.

Although the present invention has been described above in connection with several exemplary embodiments thereof, it would be apparent to those skilled in the art that those exemplary embodiments are provided solely for illustrating the present invention, and should not be relied upon to construe the appended claims in a limiting sense.

What is claimed is:

1. An optical signal monitoring system comprising:
   a bit rate information collecting unit configured to collect bit rate information indicating a bit rate of an optical signal sent through an optical communication path; and
   a monitoring unit configured to extract a monitoring optical signal from the optical signal sent through the optical communication path and correct a parameter extracted from the monitoring optical signal based on the bit rate information,
   wherein the bit rate information collecting unit collects bit rate information from a communication path other than the optical communication path.

2. The optical signal monitoring system according to claim 1, wherein the optical communication path is designed to send an optical signal of a bit rate being higher than 40 Gbit/sec.

3. The optical signal monitoring system according to claim 2, wherein the monitoring unit judges the monitoring optical signal as a noise when the bit rate information collecting unit has not been able to collect the bit rate information or has received a signal indicating that any optical signal does not pass through the optical communication path.

4. The optical signal monitoring system according to claim 1, wherein the parameter indicates a power of the optical signal sent through the optical communication path.

5. The optical signal monitoring system according to claim 1, wherein the parameter indicates a wavelength of the optical signal sent through the optical communication path.

6. The optical signal monitoring system according to claim 1, wherein the parameter indicates a S/N ratio of the optical signal sent through the optical communication path.

7. The optical signal monitoring system according to claim 1, wherein the optical communication path comprises a plurality of optical communication paths,
the bit rate information indicates a bit rate of each of optical signals respectively sent through the plurality of optical communication paths, and
the monitoring unit extracts each of the optical signals sent through the plurality of optical communication paths sequentially as a monitoring optical signal and corrects a parameter extracted from the monitoring optical signal based on information included in the bit rate information and indicating a bit rate of a corresponding optical communication path of the plurality of optical communication paths.

8. An optical signal monitoring system comprising:
a bit rate information collecting means for collecting bit rate information indicating a bit rate of an optical signal sent through an optical communication path; and
a monitoring means for extracting a monitoring optical signal from the optical signal sent through the optical communication path and correcting a parameter extracted from the monitoring optical signal based on the bit rate information,
wherein the bit rate information collecting means collects bit rate information from a communication path other than the optical communication path.

9. The optical signal monitoring system according to claim 8, wherein the monitoring means judges the monitoring optical signal as a noise when the bit rate information collecting means has not been able to collect the bit rate information or has received a signal indicating that any optical signal does not pass through the optical communication path.

10. An optical signal monitoring method for monitoring an optical signal in an optical communication line, the method comprising:
collecting bit rate information indicating a bit rate of the optical signal sent through an optical communication path from a predetermined information processing node through the optical communication line;
extracting a monitoring optical signal from the optical signal sent through the optical communication path; and
correcting a parameter extracted from the monitoring optical signal based on the bit rate information,
wherein the bit rate information is collected from a communication path other than the optical communication path.

11. The optical signal monitoring method according to claim 10, wherein the optical communication path is designed to send an optical signal of a bit rate being higher than 40 Gbit/sec.

12. The optical signal monitoring method according to claim 11, further comprising:
judging the monitoring optical signal as a noise when the bit rate information has not been collected or when a signal has been received indicating that any optical signal does not pass through the optical communication path.

* * * * *